(12) United States Patent
Wang et al.

(10) Patent No.: US 9,576,490 B1
(45) Date of Patent: Feb. 21, 2017

(54) PERSONALIZED NAVIGATION ROUTE FOR TRANSPORTATION DEVICE

(71) Applicant: GM GLOBAL TECHNOLOGY OPERATIONS LLC, Detroit, MI (US)

(72) Inventors: Peggy Wang, Shanghai (CN); Eric Chen, Shanghai (CN); Wenjing Yang, Shanghai (CN); Ron M. Hecht, Raanana (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/018,257

(22) Filed: Feb. 8, 2016

(51) Int. Cl.
  *G08G 1/0968* (2006.01)
  *G01C 21/34* (2006.01)
  *G06F 17/11* (2006.01)

(52) U.S. Cl.
  CPC ..... *G08G 1/096838* (2013.01); *G01C 21/3446* (2013.01); *G01C 21/3453* (2013.01); *G01C 21/3461* (2013.01); *G01C 21/3469* (2013.01); *G01C 21/3484* (2013.01); *G01C 21/3492* (2013.01); *G08G 1/096811* (2013.01); *G08G 1/096816* (2013.01); *G08G 1/096844* (2013.01); *G08G 1/096883* (2013.01); *G06F 17/11* (2013.01)

(58) Field of Classification Search
  None
  See application file for complete search history.

(56) References Cited

U.S. PATENT DOCUMENTS

| | | | | |
|---|---|---|---|---|
| 2013/0238162 | A1* | 9/2013 | Kobayashi | B60L 11/1861 701/1 |
| 2014/0046595 | A1* | 2/2014 | Segawa | G01C 21/34 701/541 |
| 2015/0286747 | A1* | 10/2015 | Anastasakos | G06F 17/30917 707/776 |
| 2016/0098869 | A1* | 4/2016 | Rood | G07C 5/0825 701/32.7 |
| 2016/0189308 | A1* | 6/2016 | Bogovich | G06Q 40/08 705/4 |

* cited by examiner

*Primary Examiner* — Russell Frejd
(74) *Attorney, Agent, or Firm* — Quinn Law Group, PLLC

(57) ABSTRACT

A navigation system for a transportation device, such as a vehicle, includes a controller and is at least partially operated by a driver. An off-board control module is operatively connected to a remote server and configured to communicate with the controller. The off-board control module is not physically connected to the controller. The controller has a processor and tangible, non-transitory memory on which is recorded instructions for executing a method of determining a personalized route for travelling from a start location to an end location. The controller is programmed to divide each of the plurality of routes into a respective plurality of nodes, such that adjacent ones of the plurality of nodes define a respective path (i). The personalized route is selected based at least partially on a weighted consumption score reflecting various preferences of the driver, such as fuel consumption, speed, distance travelled and other preferences.

18 Claims, 2 Drawing Sheets

PERSONALIZED NAVIGATION ROUTE FOR TRANSPORTATION DEVICE

TECHNICAL FIELD

The disclosure relates to selection of a personalized navigation route for a transportation device.

BACKGROUND

A transportation device, such as a vehicle, may have numerous routes available for travelling to a particular destination. There may be multiple countervailing reasons affecting the suitability of a particular route.

SUMMARY

A navigation system for a transportation device, such as a vehicle, includes a controller and is at least partially operated by a driver. An off-board control module is operatively connected to a remote server and configured to communicate with the controller. The off-board control module is not physically connected to the controller. The controller has a processor and tangible, non-transitory memory on which is recorded instructions for executing a method of determining a personalized route for travelling from a start location to an end location. The personalized route is selected based at least partially on a weighted consumption score reflecting various preferences of the driver, such as fuel consumption, speed, distance travelled and other preferences.

Execution of the instructions by the processor causes the controller to obtain a plurality of routes from a start location to an end location. The controller is programmed to divide each of the plurality of routes into a respective plurality of nodes, such that adjacent ones of the plurality of nodes define a respective path (i). The controller is programmed to obtain a respective path consumption score ($PS_i$) for each of the respective paths (i) based at least partially on a plurality of preference categories. The controller is programmed to obtain a respective total consumption score (TS) for each of the plurality of routes based at least partially on the respective path consumption score ($PS_i$). The controller is programmed to select the personalized route from the plurality of routes with a highest value of the respective total consumption score (TS). The controller may be programmed to control at least one parameter of the transportation device such that the transportation device adheres to the preferred route.

The preference categories are characterized by respective category scores, including a fuel consumption score ($P_1$), a speed score ($P_2$) and a distance travelled score ($P_3$). The respective category scores may include a number of traffic lights score ($P_4$) (i.e. number of traffic lights on a particular route), a number of turns score ($P_5$) (i.e. number of left or right turns on a particular route) and a personal preference score ($P_6$) (which could be any personal preference of the driver 16). Obtaining the respective path consumption score ($PS_i$) includes obtaining respective weights ($w_1, w_2, w_3$) for each of the plurality of preference categories such that a sum of the respective weights is one ($\Sigma w_n = 1$). The respective path consumption score ($PS_i$) is based on a product of the respective weights and the respective category scores such that:

$$PS_i = \Sigma(P_n * w_n) = P_1 * w_1 + P_2 * w_2 + P_3 * w_3 + \ldots$$

The off-board control module includes a multiple driver database. The controller is programmed to modify the respective path consumption score ($PS_i$) based at least partially on the multiple driver database. The path consumption score ($PS_i$) (on an $i^{th}$ path) may be based on an expected path consumption score ($PS_{i,NT}$) on a respective path (i) without a traffic factor, an expected path consumption score ($PS_{i,T}$) on a respective path (i) with a traffic factor and a sensitivity factor ($\beta$). The sensitivity factor is defined as a ratio of a covariance and a variance such that: [$\beta$=covariance ($PS_i, PS_{i,NT}$)/variance ($PS_{i,NT}$)]. The path consumption score ($PS_i$) on the respective path (i) may be defined as: $PS_i = [PS_{i,NT} + \beta * (PS_{i,T} - PS_{i,NT})]$.

Obtaining the respective total consumption score (TS) for each of the plurality of routes includes obtaining the respective total consumption score (TS) as a sum of the respective path consumption score ($PS_i$) along the respective paths (i) on each of the plurality of routes such that: $TS = [\Sigma PS_i]$.

A plurality of driving sensors, including a brake force sensor and an accelerator force sensor, are each operatively connected to the transportation device and configured to obtain respective driving data. The driving sensors are configured to communicate the respective driving data to the controller. A smart phone may be programmed to receive the respective driving data from the controller and transmit the respective driving data to the off-board control module. A data transfer device may be selectively connected to the controller and programmed to transfer the respective driving data from the controller to the smart phone. The controller may be configured to transfer the respective driving data to the off-board control module through a Wi-Fi connection.

The above features and advantages and other features and advantages of the present invention are readily apparent from the following detailed description of the best modes for carrying out the invention when taken in connection with the accompanying drawings.

DETAILED DESCRIPTION

Figure 1:
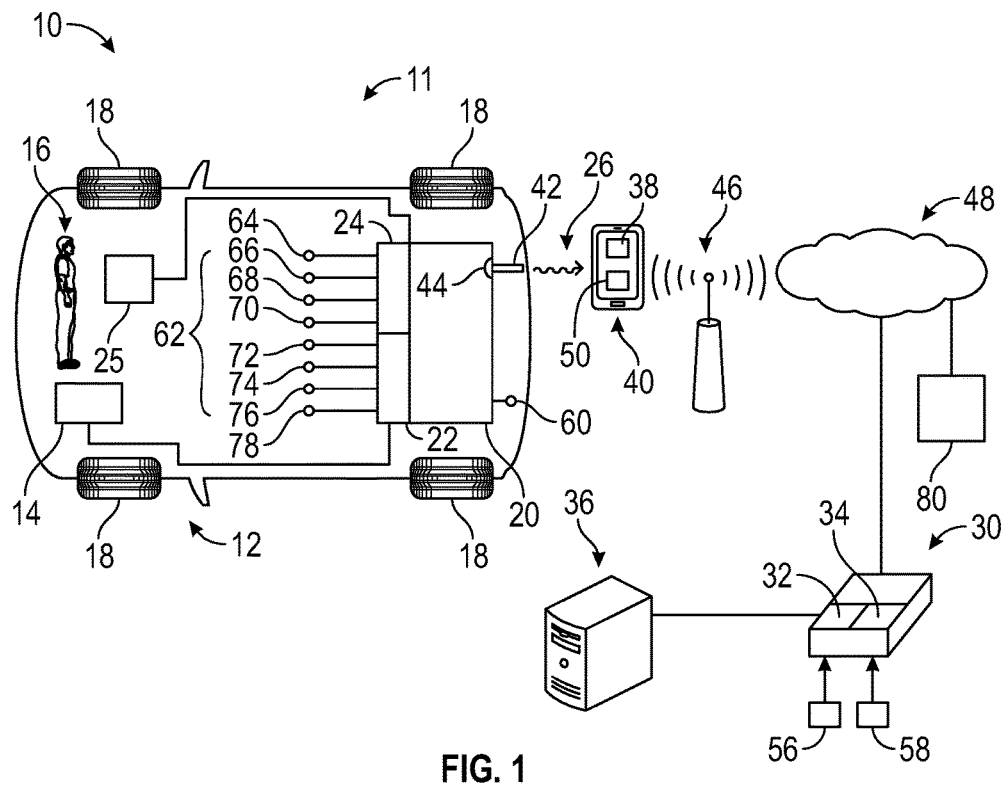
FIG. 1 is a schematic view of a navigation system for a transportation device, in accordance with a first embodiment.

Referring to the drawings, wherein like reference numbers refer to like components, FIG. 1 schematically illustrates a first navigation system 10 for a transportation device 11, in accordance with a first embodiment. In the embodiments shown, the transportation device 11 is a vehicle 12, however, it is to be understood that the transportation device 11 may be a bicycle, a robot, farm implement, sports-related equipment or other transportation device. The vehicle 12 may be a passenger vehicle, performance vehicle, military vehicle or an industrial vehicle, or any type of vehicle.

The vehicle 12 includes an energy source 14 and is at least partially operated by a driver 16. The energy source 14 may be a battery, an internal combustion engine configured to convert energy from a fossil fuel into rotational motion using a thermodynamic cycle, a hybrid engine or any other type of power source known to those skilled in the art. The vehicle 12 may include wheels 18. Referring to FIG. 1, vehicle 12 includes a controller 20 having at least one processor 22 and at least one memory 24 (or any non-transitory, tangible computer readable storage medium) on which are recorded instructions for executing method 200, shown in FIG. 3, for determining a personalized route 301 (see FIG. 4) for travelling from a start location 302(A) to an end location 304(1). The memory 24 can store controller-executable instruction sets, and the processor 22 can execute the controller-executable instruction sets stored in the memory 24.

Referring to FIG. 1, an off-board control module 30 is operatively connected to a remote server 36 and configured to communicate with the controller 20. The off-board control module 30 is not physically connected to the controller 20 and has at least one processor 32 and at least one memory 34 (or any non-transitory, tangible computer readable storage medium). The memory 34 can store controller-executable instruction sets, and the processor 32 can execute the controller-executable instruction sets stored in the memory 34. The remote server 36 may include a central processing unit and data storage unit.

In the embodiment of FIG. 1, the controller 20 may communicate with the off-board control module 30, via a first mobile application 38, running on a cellular wireless device 40, such as a smart phone 40. The circuitry and components of a remote server, cellular wireless device, mobile applications ("apps") are known to those skilled in the art. Referring to FIG. 1, a data transfer device 42 may be employed to connect to a port 44 on the controller 20 and read information (such as the "driving data" from the driving sensors 62 described below) from various sensors. The data transfer device 42 may be selectively connected (i.e. may be connected and then disconnected) to the controller 20 and specifically programmed to transfer driving data from the controller 20 to the smart phone 40. The information from various sensors may be transmitted on the vehicle bus and read from the vehicle bus by the data transfer device 42. The data transfer device 42 may be any hardware or general-purpose computer specifically programmed to retrieve data from the controller 20, when plugged into the port 44.

Referring to FIG. 1, the data transfer device 42 may transmit data to the smart phone 40 via a wireless connection 26. The data transfer device 40 may have Bluetooth™ connectivity and the wireless connection 26 may be a Bluetooth™ connection. Bluetooth™ is defined as being a short-range radio technology (or wireless technology) aimed at simplifying communications among Internet devices and between devices and the Internet. Bluetooth™ is an open wireless technology standard for transmitting fixed and mobile electronic device data over short distances and creates personal networks operating within the 2.4 GHz band. Any other type of connection may be employed.

Referring to FIG. 1, the smart phone 40 may transmit the driving data to the off-board control module 30 via an access point 46 and wireless network 48. The access point 46 is employed to broadcast a wireless signal that various devices can detect and "tune" into. The wireless network 48 may be a Wireless Local Area Network (LAN) which links multiple devices using a wireless distribution method. The wireless network 48 may be a Wireless Metropolitan Area Networks (MAN) which connects several wireless LANs. The wireless network 48 may be a Wireless Wide Area Network (WAN) which covers large areas such as neighboring towns and cities. Referring to FIG. 1, in order to connect to the access point 46 and the wireless network 48, the smart phone 40 may be equipped with a network adapter 50. The network adapter 50 interfaces with the wireless network 48 and is typically built on a printed circuit board with jumpers. The network adapter 50 may connect with the network through a built-in or externally connected antenna and may support LAN protocols such as TCP/IP.

The controller 20 (of FIGS. 1-2) is configured, i.e., specifically programmed to execute the steps of the method 200 (as discussed in detail below with respect to FIG. 3) and may receive inputs from various sensors. Referring to FIG. 1, a temperature sensor 60 is operatively connected to the controller 20 and configured to obtain the ambient temperature. Referring to FIG. 1, a plurality of driving sensors 62 may be in communication (e.g., electronic communication) with the controller 20 and configured to obtain respective driving data. The driving sensors 62 are configured to communicate the respective driving data to the controller 20. The driving sensors 62 may include a vehicle speed sensor 64, brake pedal force sensor 66, accelerator pedal force sensor 68, lateral accelerometer 70, longitudinal accelerometer 72. The driving sensors may include an engine RPM sensor 74, engine idle time sensor 76 (idling as a percentage of engine run time) and a cruise control time sensor 78.

The driving data may describe driver traits including, but not limited to: force and frequency of acceleration and braking, steering control, vehicle speed relative to a speed limit, frequency of passing and frequency of changing lanes. The respective driving data may describe accelerating and braking patterns, such as: accelerating before a turn, accelerating during a lane change, accelerating within a turn, accelerating from rest, accelerating after a turn, accelerating while passing, braking before a turn, braking after a turn, braking within a turn, braking during a lane change.

Figure 2:
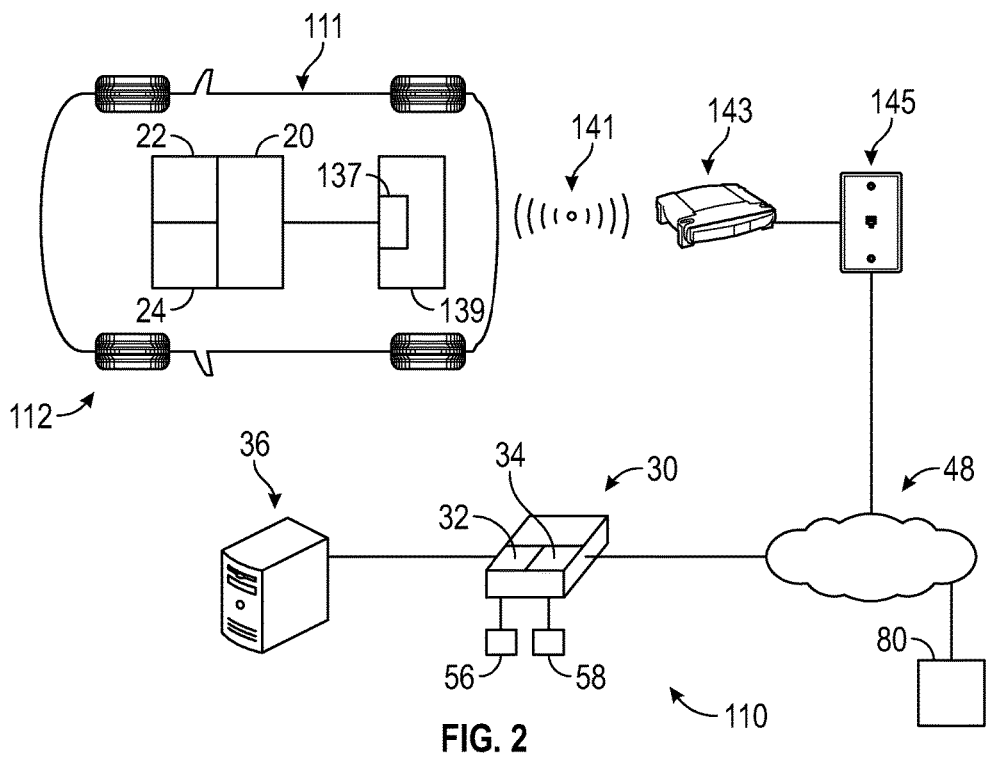
FIG. 2 is a schematic view of another navigation system for the transportation device, in accordance with a second embodiment.

Referring to FIG. 2, a second navigation system 110 for a transportation device 111, in accordance with a second embodiment is shown. The transportation device 111 may be an vehicle 112, such as a passenger vehicle, performance vehicle, military vehicle or an industrial vehicle, or a bicycle, a robot, farm implement, sports-related equipment or any other type of transportation device. The second navigation system 110 is similar in all respects to the first navigation system 10, except for the features described below. For simplicity, the driving sensors 62 are not shown in FIG. 2, however, it is understood that they are included in the vehicle 112.

In the embodiment of FIG. 2, the controller 20 may communicate with the off-board control module 30, via a second mobile application 137 that may be built into and run on a vehicle infotainment system 139. The second mobile application 137 may be integral with or physically connected (e.g. wired) to the controller 20, such that it has physical access to the data in the controller 20. The controller 20 may transmit information, including but not limited to the driving data, to the off-board control module 30 via a Wi-Fi connection 141.

Referring to FIG. 2, the Wi-Fi connection 141 may be defined as any wireless local area network product that is based on the Institute of Electrical and Electronics Engineers (IEEE) 802.11 standards. The Wi-Fi connection 141 works with no physical wired connection between sender and receiver by using radio frequency (RF) technology, a frequency within the electromagnetic spectrum associated with radio wave propagation. When an RF current is supplied to an antenna, an electromagnetic field is created that then is able to propagate through space. A routing device 143 may be employed to connect the controller 20 to a wired broadband connection 145 and wireless network 48. The routing device 143 may be a modem or other device known to those skilled in the art.

Figure 3:
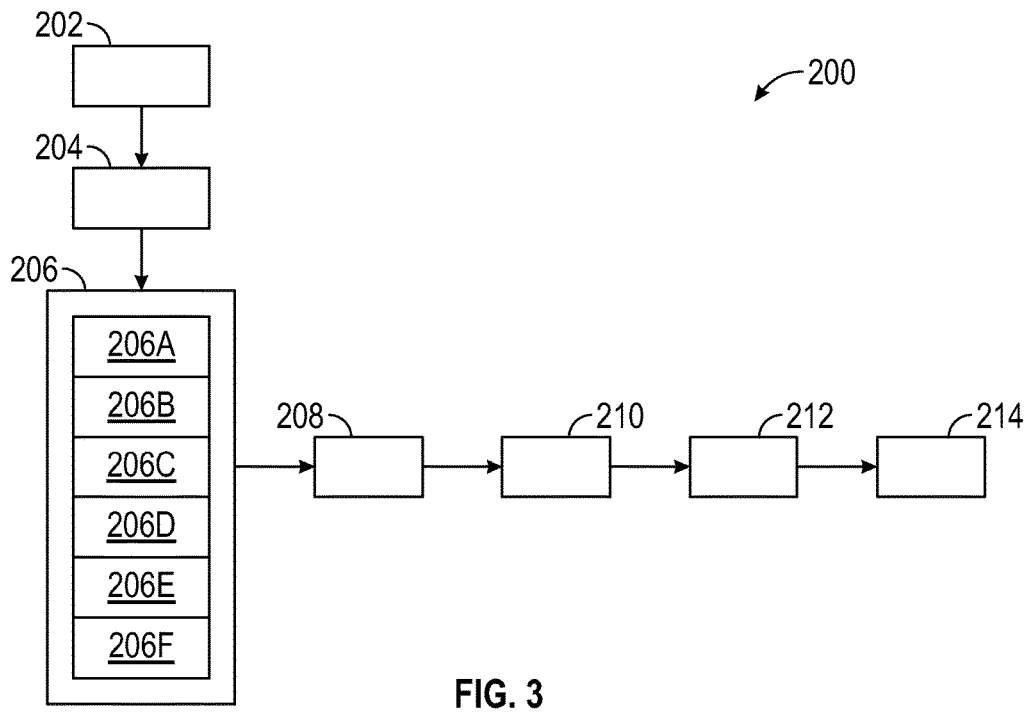
FIG. 3 is a flowchart for a method for determining a personalized route, for travelling from a start location to an end location for the device of FIGS. 1 and 2.
Figure 4:
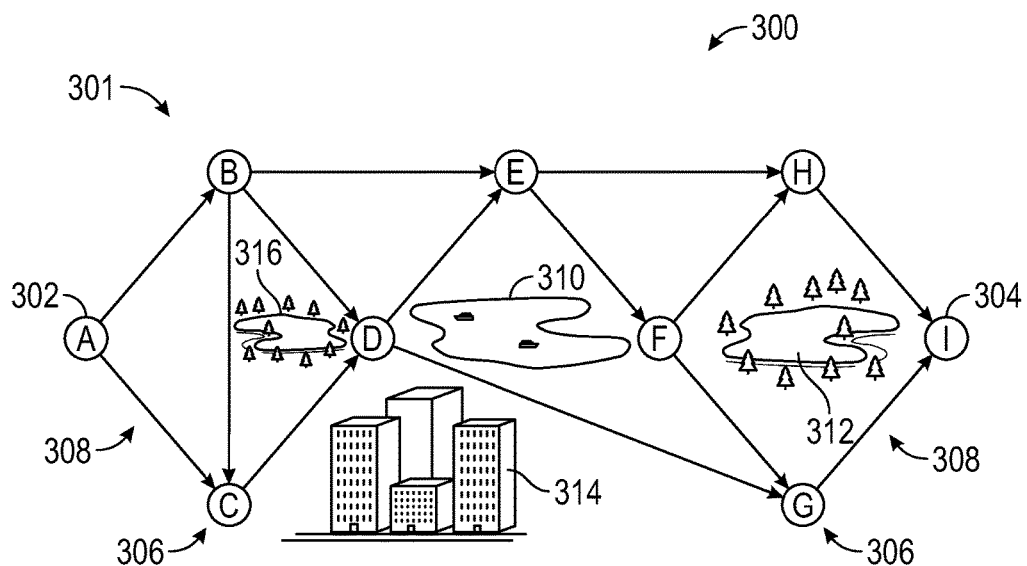
FIG. 4 is a schematic example of a plurality of nodes between the start location and the end location.

Referring now to FIG. 3, a flowchart of the method 200 stored on and executable by the controller 20 of FIGS. 1-2 is shown. Method 200 is applicable to both the first and second navigation systems 10 (shown in FIG. 1) and 110 (shown in FIG. 2). Method 200 need not be applied in the specific order recited herein. Furthermore, it is to be understood that some steps may be eliminated. Referring to FIG. 3, method 200 may begin with block 202, where the controller 20 is programmed or configured to obtain a plurality of routes from a start location to an end location. Referring to FIG. 4, an example of a plurality of routes 300 from a start location 302 (A) to an end location 304 (I) are shown. It is to be understood that identifying the plurality of routes 300 includes identifying a network of usable roads so that the plurality of routes 300 may avoid obstructions such as a lake 310, a park 312, a building 314 and a park 316. The start location 302 (A) and the end location 304 (I) may be communicated by the driver 16 to the controller 20 via a driver input 25.

In block 204 of FIG. 3, the controller 20 is programmed to divide each of the plurality of routes 300 into a respective plurality of nodes 306 (see example nodes B-H shown in FIG. 4), such that adjacent ones of the plurality of nodes 306 define respective paths 308 ($i$) (see FIG. 4). Dijkstra's algorithm, A*(A Star) or any other method known to those skilled in the art may be employed.

In block 206 of FIG. 3, the controller 20 is programmed to obtain a respective path consumption score ($PS_i$) for each of the respective paths (i) based at least partially on a plurality of preference categories. The preference categories are characterized by respective category scores, including a fuel consumption score ($P_1$), a speed score ($P_2$) and a distance travelled score ($P_3$). The respective category scores may include a number of traffic lights score ($P_4$) and a number of turns score ($P_5$) or any other preference or factor. The respective category scores may include a personal preference score ($P_6$), which correlates to any personal preference of the driver 16, such as for example, preference of city roads over highways. A relatively higher respective category score is correlated with a lesser distance travelled, higher speed, lower fuel consumption, lower number of traffic lights and lower number of turns. The respective category scores may be normalized or scaled. For example, the maximum score in each preference category may be set to 100 and the scores in the other preference categories re-scaled linearly. The driver database in the off-board control module 30 may collect data for each path 308 (i.e. between every two adjacent plurality of nodes 306) from multiple drivers. The controller 20 may use a default score if a particular respective path 308 ($i$) has not been driven upon.

Obtaining the respective path consumption score ($PS_i$) for the respective paths (i) includes: obtaining respective weights ($w_1$, $w_2$, $w_3$ . . . ) for each of the plurality of preference categories such that a sum of the respective weights is one ($\Sigma w_n = 1$). The driver 16 may select the respective weights ($w_1$, $w_2$, $w_3$ . . . ) through the driver input 25. Alternatively, the respective weights ($w_1$, $w_2$, $w_3$ . . . ) may be set to default values, such as for example, $w_1 = w_2 = w = 0.33$. The respective path consumption score ($PS_i$) is based on a product of the respective weights and the respective category scores such that:

$$PS_i = \Sigma(P_n * w_n) = P_1 * w_1 + P_2 * w_2 + P_3 * w_3 + \ldots$$

In one example, block 206 is divided into sub-blocks 206A to 206F. In block 206A of FIG. 3, the controller 20 may be programmed to obtain a fuel consumption score ($P_1$). As discussed above with reference to FIG. 1, driving sensors 62 are configured to communicate respective driving data to the controller 20. The off-board control module 30 obtains the respective driving data (as discussed above) and may create a fuel consumption profile for the driver 16. The fuel consumption profile may describe factors such as: how much fuel is used by the driver 16 per 100 miles, idling as a percentage of engine run time, hard brake (from the brake pedal force sensor 66) as a percentage of driving time and hard acceleration (from the accelerator pedal force sensor 68) as a percentage of driving time. The fuel consumption score ($P_1$) accounts for driver traits (such as hard braking, hard acceleration) and road conditions (such as a ramp). The fuel consumption score ($P_1$) characterizes the amount of fuel consumed on a particular route such that a relatively higher fuel consumption score ($P_1$) is correlated with relatively lower fuel consumption.

In block 206B of FIG. 3, the controller 20 may be programmed to obtain a speed score ($P_2$), using historical speed along the plurality of routes 300 from the off-board control module 30. Referring to FIGS. 1-2, the off-board control module 30 may be in electronic communication with and employ data from multiple transportation devices, such as a second vehicle 56 and a third vehicle 58, to obtain the historical driving speed data at a certain time period of a day.

In block 206C of FIG. 3, the controller 20 may be programmed to obtain a distance travelled score ($P_3$), which characterizes the distance traveled on each of the plurality of routes 300. Similarly, in blocks 206D and 206E of FIG. 3, the controller 20 may be programmed to obtain a number of traffic lights score ($P_4$) (i.e. number of traffic lights on a particular route) and a number of turns score ($P_5$) (for example, the number of left turns on a particular route), respectively. The off-board control module 30 may obtain the distance traveled on each of the plurality of routes 300, the number of traffic lights on a particular route, the number of turns on a particular route and other such information, from a geographical database 80 (see FIG. 1), via the wireless network 48. The geographical database 80 may be any public or commercially-available source of information known to those skilled in the art, such as for example, Google Earth.

In block 206F of FIG. 3, the controller 20 may be programmed to obtain a personal preference score ($P_6$), which could be any personal preference of the driver 16, such as for example, preference of city roads over highways. As is known, speed limits on highways are greater than city roads and there are generally no traffic lights. The nature of the personal preference may be communicated by the driver 16 through the driver input 25. The off-board control module 30 may obtain the personal preference score ($P_6$) from the geographical database 80 (see FIG. 1), via the wireless network 48 or other source.

In block 208 of FIG. 3, the controller is programmed to modify the respective path consumption score ($PS_i$) to an expected score based at least partially on a multiple driver database stored in the off-board control module 30. The off-board control module 30 (through processor 32 and memory 34) may be specifically programmed to build a multiple driver database based on driving data from drivers in multiple transportation devices, such as a second vehicle 56 and a third vehicle 58. The path consumption score ($PS_i$) (expected on an $i^{th}$ path) is based on an expected path consumption score ($PS_{i,NT}$) on the $i^{th}$ path without a traffic factor, an expected path consumption score ($PS_{i,T}$) on the $i^{th}$ path with a traffic factor and a sensitivity factor ($\beta$). The path consumption score ($PS_i$) on the $i^{th}$ path may be defined as:

$$PS_i = [PS_{i,NT} + \beta^*(PS_{1,T} - PS_{i,NT})].$$

The expected path consumption score ($PS_{i,NT}$) on the $i^{th}$ path without a traffic factor (e.g., in a midnight time session) and the expected path consumption score ($PS_{i,T}$) on the $i^{th}$ path with a traffic factor are estimated from historical driving speed data at a certain time period of a day. The sensitivity factor ($\beta$) is defined as a ratio of a covariance and a variance such that: $\beta$=covariance ($PS_i$, $PS_{i,NT}$)/variance ($PS_{i,NT}$)].

Covariance is a measure of how changes in one variable are associated with changes in a second variable. Specifically, covariance measures the degree to which two variables are linearly associated. If an increase in one variable corresponds with an increase in the other variable, the covariance is positive. Where an increase in one variable corresponds with a decrease in the other variable, the covariance is negative. The covariance between two jointly distributed real-valued random variables X and Y, where E[X] is the expected value or mean of X and assuming finite second moments, is defined as: $\sigma(X, Y)$=E[(X−E[X])(Y−E[Y])]=E[(X−E[X])(Y−E[Y])].

Variance (V) is a special case of the covariance when the two variables are identical and is defined as: $\sigma(X, X)=\sigma^2(X)$. Variance measures the degree of spread of a set of numbers. A variance of zero indicates that all the values are identical. Variance is always non-negative; a small variance indicates that the data points are close to the mean or expected value and each other, while a high variance indicates that the data points are well spread out around the mean and from each other. The square root of the variance is the standard deviation.

In block 210 of FIG. 3, the controller is programmed to obtain the respective total consumption score (TS) for each of the plurality of routes as a sum of the respective path consumption score ($PS_i$) on each of the plurality of routes such that: TS=$\Sigma PS_i$. In block 212 of FIG. 3, the controller 20 is programmed to select the personalized route 301 from the plurality of routes 300 with a highest value of the respective total consumption score (TS). In block 214, the controller 20 is programmed to control at least one operating parameter of the vehicle 12 such that the vehicle 12 adheres to the preferred route. If the vehicle 12 is following a route that was not selected by the method 200, the controller 20 may be programmed to shift to an alternative energy-saving operating mode. For example, the energy-saving operating mode may prevent high acceleration of the vehicle 12. The controller 20 may be programmed to display a visual message in an instrument panel (not shown) or other part, a voice alert or an audible chime. Thus the method 200 optimizes the operation and functioning of the transportation device 11.

For any of blocks 202, 204, 206, 208, 210 and 212, the controller 20 may retrieve data from, or otherwise work in conjunction with, the off-board control module 30 and the remote server 36 of FIG. 1, through the communication avenues discussed above. The controller 20, the off-board control module 30 and the remote server 36 of FIGS. 1-2 may include: a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A navigation system for a transportation device at least partially operated by a driver, the system comprising:
    a controller having a processor and tangible, non-transitory memory on which is recorded instructions for executing a method of determining a personalized route for travelling from a start location to an end location;
    an off-board control module operatively connected to a remote server and configured to communicate with the controller, the off-board control module not being physically connected to the controller;
    wherein execution of the instructions by the processor causes the controller to:
        obtain a plurality of routes from a start location to an end location;
        divide each of the plurality of routes into a respective plurality of nodes, such that adjacent ones of the plurality of nodes define a respective path (i);

obtain a respective path consumption score ($PS_i$) for each of the respective paths (i) based at least partially on a plurality of preference categories;

obtain a respective total consumption score (TS) for each of the plurality of routes based at least partially on the respective path consumption score ($PS_i$); and select the personalized route from the plurality of routes with a highest value of the respective total consumption score (TS).

2. The system of claim 1, wherein the controller is programmed to control at least one parameter of the transportation device such that the transportation device adheres to the personalized route.

3. The system of claim 1, wherein said obtaining the respective path consumption score ($PS_i$) for the respective paths (i) includes:

obtaining respective weights ($w_1$, $w_2$, $w_3$) for each of the plurality of preference categories such that a sum of the respective weights is one ($\Sigma w_n = 1$);

wherein the plurality of preference categories is characterized by respective category scores, including a fuel consumption score ($P_1$), a speed score ($P_2$) and a distance travelled score ($P_3$);

obtaining the respective path consumption score ($PS_i$) based on a product of the respective weights and the respective category scores such that:

$$PS_i = \Sigma(P_n * w_n) = [P_1 * w_1 + P_2 * w_2 + P_3 * w_3 + \ldots ].$$

4. The system of claim 3, wherein the respective category scores include a number of traffic lights score ($P_4$) and a number of turns score ($P_5$).

5. The system of claim 3, wherein the respective category scores include a personal preference score ($P_6$).

6. The system of claim 3, wherein:
the off-board control module includes a multiple driver database;
the controller is programmed to modify the respective path consumption score ($PS_i$) based at least partially on the multiple driver database.

7. The system of claim 6, wherein:
the respective path consumption score ($PS_i$) is based on an expected path consumption score ($PS_{i,NT}$) on the respective path (i) without a traffic factor, an expected path consumption score ($PS_{i,T}$) on the respective path (i) with a traffic factor and a sensitivity factor ($\beta$); and
wherein the sensitivity factor is defined as a ratio of a covariance and a variance such that: [$\beta$=covariance ($PS_i$, $PS_{i,NT}$)/variance ($PS_{i,NT}$)].

8. The system of claim 7, wherein the respective path consumption score ($PS_i$) is defined as: $PS_i = [PS_{i,NT} + \beta * (PS_{i,T} - PS_{i,NT})]$.

9. The system of claim 3, wherein said obtaining the respective total consumption score (TS) for each of the plurality of routes includes obtaining the respective total consumption score (TS) as a sum of the respective path consumption score ($PS_i$) along the respective paths (i) on each of the plurality of routes such that: TS=[$\Sigma PS_i$].

10. The system of claim 9, further comprising:
a plurality of driving sensors configured to obtain the respective driving data and communicate the respective driving data to the controller, the plurality of driving sensors including a brake force sensor and an accelerator force sensor.

11. The system of claim 10, further comprising:
a smart phone programmed to receive the respective driving data from the controller and transmit the respective driving data to the off-board control module;

a data transfer device connectable to the controller and programmed to selectively transfer the respective driving data from the controller to the smart phone;
wherein the off-board control module is programmed to construct a fuel consumption profile from the respective driving data.

12. The system of claim 10, wherein:
the controller is configured to transfer the respective driving data to the off-board control module through a Wi-Fi connection; and
the off-board control module is programmed to construct a fuel consumption profile from the respective driving data.

13. A method of navigation for a transportation device for travelling from a start location to an end location, the transportation device having a controller in communication with an off-board control module, the off-board control module not being physically connected to the controller, the transportation device being at least partially operated by a driver, the method comprising:

obtaining, via the controller, a plurality of routes from the start location to the end location;

dividing each of the plurality of routes into a respective plurality of nodes, such that adjacent ones of the plurality of nodes define a respective path (i), via the controller;

obtaining a respective path consumption score ($PS_i$) for each of the respective paths (i) based at least partially on a plurality of preference categories, via the controller;

obtaining a respective total consumption score (TS) for each of the plurality of routes based at least partially on the respective path consumption score ($PS_i$), via the controller; and selecting the personalized route from the plurality of routes with a highest value of the respective total consumption score (TS), via the controller.

14. The method of claim 13, wherein said obtaining the respective path consumption score ($PS_i$) for the respective paths (i) includes:

obtaining respective weights ($w_1$, $w_2$, $w_3$) for each of the plurality of preference categories such that a sum of the respective weights is one ($\Sigma w_n = 1$);

wherein the plurality of preference categories is characterized by respective category scores, including a fuel consumption score ($P_1$), a speed score ($P_2$) and a distance travelled score ($P_3$);

obtaining the respective path consumption score ($PS_i$) based on a product of the respective weights and the respective category scores such that:

$$PS_i = \Sigma(P_n * w_n) = [P_1 * w_1 + P_2 * w_2 + P_3 * w_3 + \ldots ].$$

15. The method of claim 14, wherein the respective category scores include a number of traffic lights score ($P_4$) and a number of turns score ($P_5$).

16. The method of claim 14, wherein:
the respective path consumption score ($PS_i$) is based on an expected path consumption score ($PS_{i,NT}$) on the respective path (i) without a traffic factor, an expected path consumption score ($PS_{i,T}$) on the respective path (i) with a traffic factor and a sensitivity factor ($\beta$); and
the sensitivity factor is defined as a ratio of a covariance and a variance such that: [$\beta$=covariance ($PS_i$, $PS_{i,NT}$)/variance ($PS_{i,NT}$)].

17. The method of claim 16, wherein the respective path consumption score ($PS_i$) is defined as: $PS_i = [PS_{i,NT} + \beta * (PS_{i,T} - PS_{i,NT})]$.

18. The method of claim 16, wherein said obtaining the respective total consumption score (TS) for each of the plurality of routes includes obtaining the respective total consumption score (TS) as a sum of the respective path consumption score ($PS_i$) on each of the plurality of routes such that: TS=[$\Sigma\ PS_i$].

\* \* \* \* \*